3,079,424
PROCESS FOR THE PREPARATION OF CYANO-
ACETYLENE FROM ACETYLENE AND HYDRO-
GEN CYANIDE
Lawrence J. Krebaum, Texas City, Tex., assignor to
Monsanto Chemical Company, St. Louis, Mo., a corporation of Delaware
No Drawing. Filed Oct. 24, 1960, Ser. No. 64,290
3 Claims. (Cl. 260—465.3)

The present invention relates to a new method for the preparation of cyanoacetylene or propargyl nitrile.

Cyanoacetylene, a chemical compound useful as a cyanovinylating agent in the production of cyanovinyl monomers, has heretofore been obtained from propiolic acid by converting the acid to the corresponding amide and then dehydrating the latter with phosphorus pentoxide. It has now been discovered that this interesting and reactive compound can be prepared in a relatively simple manner directly from acetylene.

According to the invention, a mixture of acetylene and hydrogen cyanide is reacted at a temperature within the range from about 700° to about 1100° C. In the preferred embodiment of the process, a gaseous mixture of acetylene and hydrogen cyanide together with a diluent gas is continuously passed through a reaction zone heated to reaction temperature at a rate such that the mixture remains therein for the desired reaction period. The gases issuing from the reaction zone are quenched as rapidly as possible and the cyanoacetylene is separated from the gases by condensation. The diluent gas is optional and is used mainly to facilitate acetylene handling because of the hazards connected therewith although it acts also to reduce any secondary reactions such as polymerization, cracking, etc.

The invention is illustrated in the following example which, however, is not to be construed as limiting it in any manner whatsoever.

EXAMPLE 1

The experimental apparatus was comprised of a reactor consisting of an empty "Vycor" (96% silica) tube having an effective length of 20 cm. disposed within a muffle furnace together with inlet and outlet manifolds, an HCN vaporizer and accessory lines, a mixing chamber for the reactant gases, and a product gas receiver. Prior to a run, the system was warmed up while argon was passed through it. Acetylene and HCN vapors were fed through rotameters into the mixing chamber and then passed through the reactor which had been heated to the desired temperature. The effluent gas from the reactor was collected in a heated receiver from which it was exhausted into a sample bomb. Reaction times in the reactor were varied by using tubes of various diameters, by changing feed rates, or by adding argon as an inert diluent to the reaction mixture. A series of runs was made following this procedure under various conditions of temperature, reactant feed ratio, reaction time, etc. Gas samples were obtained and analyzed by means of a mass spectrometer. Analyses were expressed on a mole percentage basis. Conversions and yields calculated from the analytical data under the various conditions are recorded in Table I.

Table I

| Run No. | Temp., °C. | Mole ratio $HCN:C_2H_2:A$ | Reaction time (sec.) | Yield (percent based on HCN) | | |
|---|---|---|---|---|---|---|
| | | | | Cyanoacetylene | Acrylonitrile | $(CN)_2$ |
| 1 | 770 | 4:1:8.5 | 0.36 | 4.3 | 38.6 | 11.4 |
| 2 | 875 | 4:1:7 | 0.38 | 13.6 | 43.2 | 6.1 |
| 3 | 900 | 15:1:0.4 | 0.30 | 40.9 | 27.2 | 26.2 |
| 4 | 915 | 7:1:1.5 | 0.37 | 32.5 | 32.5 | 18.2 |
| 5 | 920 | 5.5:1:2.5 | 0.34 | 33.5 | 33.0 | 18.7 |
| 6 | 925 | 0.5:1:0.6 | 0.38 | 29.0 | 7.0 | 25.2 |
| 7 | 975 | 4:1:6 | 0.25 | 37.4 | 19.4 | 15.8 |

It will be seen from the tabulated data that not only is cyanoacetylene formed in good yields but acrylonitrile, a valuable chemical of commerce, is also produced as is cyanogen. In view of the fact that it has recently been determined that cyanogen will react with acetylene under conditions similar to those in this process to yield cyanoacetylene, the cyanogen made can be recycled to the reaction zone together with an increased amount of acetylene to react therewith and thus produce greater amounts of cyanoacetylene by simultaneous occurrence of the two reactions.

Variations in procedure and reaction conditions from those given in the example may be made without departing from the scope of the invention. For example, the reaction may be carried out in a tubular reactor of quartz, porcelain, or any other refractory material which is non-catalytic and capable of withstanding the temperatures employed as well as in the silica reactor exemplified. The gases can, if desired, be passed through a series of reaction zones heated to reaction temperature, the mixture being cooled as it issues from each reactor to recover the cyanoacetylene and other reaction products therefrom. Unreacted feed materials and cyanogen can then be recycled.

While the reaction may be conducted at any temperature in the range from 770° C. to 1100° C., the preferred temperatures for the reaction are those between 900° C. and 1000° C.

Reaction time, i.e., the time during which the reactant mixture is maintained at reaction temperature in the reaction zone, varies with the particular temperature employed. Generally, any decrease in temperature requires an increase in reaction time and convesely an increase in temperature will necessitate a shorter reaction time. Reaction times from about 0.05 second to about 2 seconds are satisfactory at temperatures in the range from 770° C. to 1100° C. In the preferred temperature range, reaction time may vary from about 1 second at 900° C. to about 0.1 second at 1000° C.

The pressure employed is preferably atmospheric but operation at either subatmospheric or superatmospheric pressures is feasible.

A wide range of reactant ratios can be employed. Mole ratios of HCN to acetylene varying from 4:1 to 20:1 can be used. Preferred, however, for practical operation are those in the highest end of the range, i.e., from 15:1 to 20:1. An excess of HCN appears to be desirable since it not only leads to better yields of cyanoacetylene but also tends to reduce the formation of tar, soot and other degradative by-products.

Inert gaseous diluents as pointed out previously may be present in the reaction mixture and it is frequently desirable to eliminate hazards connected with acetylene to employ diluents such as carbon dioxide, nitrogen, argon and the like in order to achieve the short reaction times required. HCN is a practical diluent as well as a reactant. Any amount of diluent can be employed with the mole fraction added being in the range from 0%–99% of the reaction mixture.

Recovery of the cyanoacetylene can be effected by low-temerature condensation of the effluent gas mixture, followed by fractional distillation of the liquid condensate in a conventional manner. Unreacted acetylene and hydrogen cyanide can be recycled to the reaction zone if desired.

What is claimed is:

1. The process for producing cyanoacetylene which consists essentially of reacting acetylene and hydrogen cyanide at a temperature within the range from about 770° C. to about 1100° C. for a period of time from about 0.05 to about 2 seconds while maintaining the mole ratio of hydrogen cyanide to acetylene within the large range from about 4:1 to about 20:1.

2. The process for producing cyanoacetylene which consists essentially of reacting acetylene and hydrogen cyanide at a temperature within the range from about 900° C. to about 1000° C. for a period of time from about 0.1 second to about 1 second while maintaining the mole ratio of hydrogen cyanide to acetylene within the range from about 15:1 to about 20:1, said acetylene being diluted in an amount up to about 99 mole percent of the acetylene charged with a gas which is inert under said reaction conditions.

3. The process for producing cyanoacetylene which consists essentially of passing a mixture of hydrogen cyanide and acetylene in a mole ratio within the range from about 15:1 to about 20:1, said acetylene being diluted with an inert gas in an amount up to about 99 mole percent of the acetylene charged of a gas which is inert under the reaction conditions employed, through an empty tube maintained at a temperature from about 900° C. to about 1000° C. at a rate such that the gas mixture is maintained at reaction temperature for a period from about 0.1 second to about 1 second.

References Cited in the file of this patent

UNITED STATES PATENTS 2,847,448    Gabbett et al. _____ Aug. 12, 1958